(12) United States Patent
Zheng

(10) Patent No.: US 10,856,693 B2
(45) Date of Patent: Dec. 8, 2020

(54) PROCESS FOR MANUFACTURING FRYING PAN

(71) Applicant: Ningbo Huige Outdoor Products Co., Ltd., Zhejiang (CN)

(72) Inventor: Songcun Zheng, Zhejiang (CN)

(73) Assignee: Ningbo Huige Outdoor Products Co., Ltd., Zhejiang (CN)

( * ) Notice: Subject to any disclaimer, the term of this patent is extended or adjusted under 35 U.S.C. 154(b) by 97 days.

(21) Appl. No.: 16/226,667

(22) Filed: Dec. 20, 2018

(65) Prior Publication Data

US 2020/0138241 A1    May 7, 2020

(30) Foreign Application Priority Data

Nov. 1, 2018   (CN) .......................... 2018 1 1294680

(51) Int. Cl.
| | |
|---|---|
| *A47J 37/10* | (2006.01) |
| *A47J 36/02* | (2006.01) |
| *B05D 5/08* | (2006.01) |
| *B05D 7/14* | (2006.01) |
| *B21D 51/22* | (2006.01) |

(52) U.S. Cl.
CPC .............. *A47J 37/10* (2013.01); *A47J 36/025* (2013.01); *B05D 5/08* (2013.01); *B05D 7/14* (2013.01); *B21D 51/22* (2013.01); *B23P 2700/05* (2013.01)

(58) Field of Classification Search
CPC ......... A47J 27/002; A47J 37/10; A47J 36/02; A47J 36/025; A47J 36/04; B21D 51/22; B23P 2700/05

See application file for complete search history.

(56) References Cited

U.S. PATENT DOCUMENTS

| | | | | |
|---|---|---|---|---|
| 2015/0108143 A1* | 4/2015 | Groll | ...................... | B21D 22/12 |
| | | | | 220/573.2 |
| 2017/0071401 A1* | 3/2017 | Fang | ........................ | B05D 1/02 |
| 2017/0303737 A1* | 10/2017 | Allemand | .............. | A47J 45/061 |
| 2018/0020869 A1* | 1/2018 | Bertozzini | ............ | A47J 27/002 |
| | | | | 220/573.1 |

FOREIGN PATENT DOCUMENTS

CN             107309606 A    *  11/2017   .............. B23P 15/00

OTHER PUBLICATIONS

Translation of CN-107309606-A (Year: 2017).*

* cited by examiner

*Primary Examiner* — Matthew P Travers
(74) *Attorney, Agent, or Firm* — JCIPRNET

(57) ABSTRACT

A process for manufacturing a frying pan includes the steps of material selecting, cutting, machining and forming, welding, grinding, sanding, cleaning, baking, preparing of a ceramic paint, spraying of a ceramic paint, curing, cooling and the like.

10 Claims, No Drawings

PROCESS FOR MANUFACTURING FRYING PAN

CROSS-REFERENCE TO RELATED APPLICATION

This application claims the priority benefit of China application serial no. 201811294680.7, filed on Nov. 1, 2018. The entirety of the above-mentioned patent application is hereby incorporated by reference herein and made a part of this specification.

BACKGROUND

Technical Field

The invention relates to a process for manufacturing a frying pan, in particular to a process for manufacturing a frying pan for a barbecue grill.

Related Art

In general, common frying pans for barbecue grills on the market at present are iron frying pans manufactured with conventional processes, which mainly include an iron plate oil-baking process, an iron plate sanding and baking process and an enameling process. Wherein, the iron plate oil-baking process mainly comprises the steps of spraying edible oil on the surface of an iron frying pan and then airing or baking, and the frying pan manufactured with this process tends to be contaminated with dirt on the surface and meanwhile, has flow marks of oil and takes on an uneven oily yellow color after the bake-out of oil stains, resulting in poor texture, moreover, oiling is needed for moisture protection after use, or else the frying pan rust; the iron plate sanding and oiling process mainly comprises the steps of sanding the surface of the iron plate and then performing rust-proof treatment so that the surface of the iron plate keeps both the texture of tiny particles and the silver metal texture, and the frying pan obtained with this manufacturing process is superior to that manufactured with the iron plate oil-baking process with respect to texture, but is poor in resistance to wear and scratch and incapable of withstanding moisture and rain, moreover, oiling is still needed for moisture protection after use, or else the frying pan would rust; and the iron plate enameling process mainly comprises the step of enameling the surface of the iron plate to endow the manufactured frying pan with both better moisture-proof and rustproof performance and better texture, however, the enameling production is complicated in process, has higher requirements for materials, equipment, operation, packaging and transportation and the like, and has the disadvantages of frequent enamel bursting, low shock resistance, high scrap ratio and high cost, moreover, the paint contains heavy metal, which is neither sanitary nor safe.

SUMMARY OF THE INVENTION

A technical problem to be solved by the invention is to provide a process for manufacturing a frying pan with simple process and good finished product quality.

To solve the technical problem above, the invention employs a technical solution as follows:

a process for manufacturing a frying pan comprises the following steps of:

(1) material selecting: selecting a cold-rolled plate/hot-rolled plate as a basic plate;

(2) cutting: cutting the basic plate into a compliant plate according to a specification required by frying pan machining;

(3) machining and forming: die-cutting and bending the plate to obtain a pre-formed frying pan;

(4) welding: welding side seams present at bends of the pre-formed frying pan, and meanwhile welding a fixed base to the bottom of the pre-formed frying pan;

(5) grinding: grinding burrs, welding bumps and welding marks on the frying pan obtained from the previous step, and shaping uneven parts of the frying pan to keep the frying pan even;

(6) sanding: sanding and blasting six faces of the frying pan ground in Step (5) with brown fused alumina sand;

(7) cleaning: cleaning the frying pan sanded;

(8) baking: baking the frying pan cleaned to remove moisture on the surface of the frying pan;

(9) preparing a ceramic paint: preparing a ceramic paint consisting of a primer and a finish paint, for painting the frying pan;

(10) spraying of the ceramic paint: preheating the frying pan obtained from Step (8) to 70° C., monitoring surface temperature of the frying pan by using an infrared thermometer, and spraying the frying pan with the primer and the finish paint prepared in Step (9) when detecting that the surface temperature of the frying pan reaches 30-40° C., to be specific, spraying a layer of the primer at first, leveling after the spraying of the primer, standing for 2-3 minutes, and then spraying the finish paint directly;

(11) curing: after the painted surface of the frying pan is dried, baking and curing the painted surface; and

(12) cooling: naturally cooling the frying pan cured to obtain a finished frying pan.

The basic plate in Step (1) has the thickness of 3-5 mm.

In Step (4), the frying pan with the fixed base welded also needs to be welded with reinforcing ribs and baffles according to specific design requirements.

The brown fused alumina sand used in Step (6) has the roughness of 40-60 meshes.

The sanding in Step (6) is performed for 30 min.

The cleaning in Step (7) specifically comprises the following steps of:

① performing primary spraying and washing on the frying pan by using clean water with the temperature of 40-50° C. under a spraying pressure set as 0.1-0.2 MPa;

② degreasing: degreasing the frying pan that is primarily sprayed and washed, with a degreasing bath solution to remove oil and grease adhered to the surface of the frying pan;

③ performing secondary spraying and washing on the degreased frying pan by using normal-temperature water under a spraying pressure set as 0.1-0.2 MPa; and ④ performing third spraying and washing on the frying pan that is secondarily sprayed and washed, by using normal-temperature water under a spraying pressure set as 0.1-0.2 MPa.

The degreasing bath solution used during degreasing is prepared by blending an alkaline degreaser SD-212A and a degreaser SD-212B at a ratio of 1:1 with tap water, with the concentration of 5%, the pH value of 10-12 and the alkalinity of 10-20 mol/L.

Furthermore, the alkaline degreaser comprises the main components of alkali and alkali metal salts (sodium hydroxide, sodium carbonate, sodium silicate and sodium phosphate); the alkaline degreaser SD-212A comprises the following components: 20% of a penetrating agent, 30% of an emulsifier OP, 5% of 1310-73-2 soda ash and the balance of water; and the degreaser SD-212B comprises the following components: 20% of a penetrating agent, 30% of a low-foam emulsifier, 2% of a defoamer, 5% of 497-19-8 soda ash and the balance of water.

The baking in Step (8) is performed at the temperature of 120-150° C. The baking time is subject to the dryness of water on the surface of the fying pan.

The primer and the finish paint in Step (9) are prepared specifically as follows:

①the primer is prepared with the steps of: taking a black ceramic paint with the model of 2N-780A, placing the black ceramic paint on a tumbling machine at the revolving speed of 100-150 turns/min for tumbling for 30 min until sediments in the black ceramic paint completely disappear; and weighing the well-agitated black ceramic paint and a black ceramic paint with the model of 2N-780B, placing both into an airtight container at a ratio of 1:1, and placing the airtight container on the tumbling machine at the revolving speed of 100-150 turns/min for tumbling for 2-3 hours to obtain a cured primer; and filtering the cured primer with a sieve screen of 150-200 meshes to obtain the primer required for spraying; and ②the finish paint is prepared with the steps of: weighing an overprint varnish A and an overprint varnish B, placing both into an airtight container at a ratio of 1:2, and placing the airtight container on the tumbling machine at the revolving speed of 100-150 turns/min for tumbling for 2-3 hours to obtain a cured finish paint; and filtering the cured finish paint with a sieve screen of 150-200 meshes to obtain the finish paint required for spraying.

The paint above contains no heavy metal and other hazardous substances so that the manufactured frying pan is more sanitary, safer and more environment-friendly.

In step 10, the ambient temperature of a spray room is required to be 26-30° C., and the thickness of each coating sprayed is controlled to be 20-40 um.

The baking and curing in Step (11) is performed at the temperature of 190-200° C. for 30 min.

Compared with the prior art, the invention has the following advantages:

(1) the process described above has no special requirements for the components of the basic material, i.e., the material of the iron plate, for manufacturing the frying pan, both common cold-rolled plate and hot-rolled plate can be used, therefore, this process has low requirement for material selection, leading to low production cost;

(2) the sanding in Step (6) allows the surface of the frying pan to achieve the texture of uneven tiny particles, so that a prepared product has a high degree of finish with good quality and look, in addition, sand holes resulting from sanding enhances the adhesion of the ceramic on the surface of the frying pan to endow the frying pan with good resistance to scratch and wear and prolonged service life;

(3) the cleaning in Step (7) can remove oil stains, dirt, dust, metal particles and the like on the surface of the frying pan, ensuring the frying pan is effectively and evenly sprayed and has a clean appearance with better adhesion;

(4) the baking in Step (8) can prevent the iron frying pan from getting rusty and oxidized due to moisture before spraying and subsequently prevent the moisture on the surface of the frying pan from affecting the subsequent spraying evenness;

(5) the spraying in Step (10) is simple and convenient to operate, reducing the requirements on the skills of workers;

(6) compared with the curing for the enameled frying pan, the curing in Step (11) is performed at low temperature, effectively reducing the energy consumption and consequently the production cost;

(7) the frying pan manufactured with the process above has the following advantages:

①there is no quality abnormalities such as enamel bursting and fish-scaling, and the percent of pass is significantly increased for the finished product;

②the finished product is good in non-stickiness;

③the surface of the finished product has good resistance to high temperature and corrosion (caused by acid, alkaline and salt);

④the surface of the finished product has better shock resistance so that the requirements for packaging and transportation can be properly reduced;

⑤oiling and other protections are not needed after use, thereby improving the use experience;

⑥the finished product has good resistance to scratch and wear; and

⑦the finished product contains no heavy metal and other hazardous substances, meets the requirements of food-grade test standards and is safer to use.

DETAILED DESCRIPTION OF THE EMBODIMENTS

The invention will be further described in detail below in conjunction with embodiments.

A process for manufacturing a frying pan comprises the following steps of:

(1) material selecting: selecting a cold-rolled plate/hot-rolled plate as a basic plate;

(2) cutting: cutting the basic plate into a compliant plate according to a specification required by frying pan machining;

(3) machining and forming: die-cutting and bending the plate to obtain a pre-formed frying pan;

(4) welding: welding side seams present at bends of the pre-formed frying pan, and meanwhile welding a fixed base to the bottom of the pre-formed frying pan;

(5) grinding: grinding burrs, welding bumps and welding marks on the frying pan obtained from the previous step, and shaping uneven parts of the frying pan to keep the frying pan even;

(6) sanding: sanding and blasting six faces of the frying pan ground in Step (5) with brown fused alumina sand;

(7) cleaning: cleaning the frying pan sanded;

(8) baking: baking the frying pan cleaned to remove moisture on the surface of the frying pan;

(9) preparing a ceramic paint: preparing a ceramic paint consisting of a primer and a finish paint, for painting the frying pan;

(10) spraying of the ceramic paint: preheating the frying pan obtained from Step (8) to 70° C., monitoring surface temperature of the frying pan by using an infrared thermometer, and spraying the frying pan with the primer and the finish paint prepared in Step (9) when detecting that the surface temperature of the frying pan reaches 30-40° C., to be specific, spraying a layer of the primer at first, leveling after the spraying of the primer, standing for 2-3 minutes, and then spraying the finish paint directly;

(11) curing: after the painted surface of the frying pan is dried, baking and curing the painted surface; and

(12) cooling: naturally cooling the frying pan cured to obtain a finished frying pan.

The basic plate in Step (1) has a thickness of 3-5 mm. For the selection of the iron plate with a specification within this range, both economy and practicability are taken into consideration for the design of a barbecue grill, since the basic plate thinner than 3 mm tends to deform during sanding and barbecuing to lead to unsatisfactory barbecuing effect, and the selection of a basic plate thicker than 5 mm may lead to high cost and non-economy.

In Step (4), the frying pan with the fixed base welded also needs to be welded with reinforcing ribs or added with baffles when necessary according to specific design requirements. If the frying pan is large and tends to deform and warp during barbecuing, reinforcing ribs or thermal baffles and other reinforcing structures can be welded or added to the bottom of the frying pan to reinforce the structure and reduce the deformation.

The brown fused alumina sand used in Step (6) has the roughness of 40-60 meshes. With higher hardness, better sanding effect, relatively lower loss and low cost, the brown fused alumina of 40-60 meshes can be selected for sanding to achieve the surface roughness enabling better look and texture for the frying pan.

The sanding in Step (6) is performed for 30 min. The sanding time is set as 30 min, so that each face of the frying pan can be ensured to be sanded sufficiently with consistent roughness, and the control over this time is determined by taking both practicability and economy into consideration.

The cleaning in Step (7) specifically comprises the following steps:

① performing primary spraying and washing on the frying pan by using clean water with the temperature of 40-50° C. under a spraying pressure set as 0.1-0.2 MPa, where the clean water at 40-50° C. has better dissolvability and can better dissolve and remove oil stains on the frying pan; this step is to remove oil stains and dust and the like of large particles on the surface of the frying pan, making preparations for the degreasing followed and reducing the consumption of degreaser and other cleaners; and the spraying pressure selected is an optimal result from the comprehensive considerations of economy and practicability;

② degreasing: degreasing the frying pan that is primarily sprayed and washed, with a degreasing bath solution to remove oil and grease adhered to the surface of the frying pan, where this step is to dissolve and decompose stubborn oil and grease on the surface of the frying pan;

③ performing secondary spraying and washing on the degreased frying pan by using normal-temperature water under a spraying pressure set as 0.1-0.2 MPa, where this step is to clean away the degreaser, degreased and decomposed residues, tiny dust and the like on the surface of the degreased frying pan; and the spraying pressure selected is an optimal result from the comprehensive considerations of economy and practicability;

④ performing third spraying and washing on the frying pan that is secondarily sprayed and washed, by using normal-temperature water under a spraying pressure set as 0.1-0.2 MPa, where this step is to clean away the residual degreaser, degreased and decomposed residues, tiny dust and the like continuously remained on the surface of the degreased frying pan; and the spraying pressure selected is an optimal result from the comprehensive considerations of economy and practicability.

The degreasing bath solution used during degreasing is prepared by blending an alkaline degreaser SD-212A and a degreaser SD-212B at a ratio of 1:1 with tap water, with the concentration of 5%, the pH value of 10-12 and the alkalinity of 10-20 mol/L.

Furthermore, the alkaline degreaser comprises the main components of alkali and alkali metal salts (sodium hydroxide, sodium carbonate, sodium silicate and sodium phosphate); the alkaline degreaser SD-212A comprises the following components: 20% of a penetrating agent, 30% of an emulsifier OP, 5% of 1310-73-2 soda ash and the balance of water; and the degreaser SD-212B comprises the following components: 20% of a penetrating agent, 30% of a low-foam emulsifier, 2% of a defoamer, 5% of 497-19-8 soda ash and the balance of water.

The baking in Step (8) is performed at the temperature of 120-150° C. The baking time is subject to the dryness of water on the surface of the fying pan. The temperature selected above is an optimal result from the comprehensive considerations of economy and practicability.

The primer and the finish paint in Step (9) are prepared specifically as follows:

① the primer is prepared with the steps of: taking a black ceramic paint with the model of 2N-780A, placing the black ceramic paint on a tumbling machine at the revolving speed of 100-150 turns/min for tumbling for 30 min until sediments in the black ceramic paint completely disappear; and weighing the well-agitated black ceramic paint and a black ceramic paint with the model of 2N-780B, placing both into an airtight container at a ratio of 1:1, and placing the airtight container on the tumbling machine at the revolving speed of 100-150 turns/min for tumbling for 2-3 hours to obtain a cured primer; and filtering the cured primer with a sieve screen of 150-200 meshes to obtain the primer required for spraying; and ② the finish paint is prepared with the steps of: weighing an overprint varnish A and an overprint varnish B, placing both into an airtight container at a ratio of 1:2, and placing the airtight container on the tumbling machine at the revolving speed of 100-150 turns/min for tumbling for 2-3 hours to obtain a cured finish paint; and filtering the cured finish paint with a sieve screen of 150-200 meshes to obtain the finish paint required for spraying.

The paint above contains no heavy metal and other hazardous substances so that the manufactured frying pan is more sanitary, safer and more environment-friendly.

The paint above is an aqueous ceramic paint manufactured by Tnano Co., Ltd from Guangzhou.

The ambient temperature of a spray room is required to be 26-30° C., and the thickness of each coating sprayed is controlled to be 20-40 um. The ambient temperature above is good for both the adhesion of paint and the work of workers. If the temperature is overly-low, the paint tends to be poor in adhesion when sprayed to the surface of a workpiece; with overly-thin layer of ceramic paint, the paint cannot cover the surface of the frying pan effectively, leading to disqualification; and with overly-thick layer of ceramic paint, a product is brittle and may be damaged easily, resulting in non-economy.

The baking and curing in Step (11) is performed at the temperature of 190-200° C. for 30 min. In the event of overly-low temperature or insufficient curing time, the adhesion of the ceramic on the surface of the frying pan fails to meet the requirement to cause problems such as peeling; and in the event of overly-high temperature or overly-long curing time, the ceramic may age easily to cause color inconsistency on the surface of the frying pan, leading to chromatic aberration and other problems; and the temperature and time as designed above are available to obtain finished products with superior quality.

What is claimed is:

1. A process for manufacturing a frying pan, comprising the following steps of:
    (1) selecting a cold-rolled plate/hot-rolled plate as a workpiece;
    (2) cutting the workpiece into a plate having a predetermined size and a predetermined shape;
    (3) die-cutting and bending the plate to obtain a pre-formed frying pan;
    (4) welding a fixed base to a bottom of the pre-formed frying pan;
    (5) grinding burrs, welding bumps and welding marks on the frying pan obtained from the previous step;
    (6) sanding and shot blasting the frying pan ground in Step (5) with brown fused alumina sand;
    (7) cleaning the sanded frying pan;
    (8) baking the cleaned frying pan to remove moisture on a surface of the frying pan;
    (9) preparing a primer and a finish paint, for painting the frying pan;
    (10) preheating the frying pan obtained from Step (8) to 70° C., monitoring a surface temperature of the frying pan by using an infrared thermometer, and spraying the frying pan with the primer and the finish paint prepared in Step (9) when detecting that the surface temperature of the frying pan is 30-40° C., wherein the primer is sprayed to the frying pan at first, and then, after a waiting period of 2-3 minutes, the finish paint is sprayed to the frying pan;
    (11) after the painted surface of the frying pan is dried, baking and curing the painted surface; and
    (12) cooling the frying pan cured to obtain a finished frying pan.

2. The process for manufacturing the frying pan according to claim 1, wherein the workpiece in Step (1) has a thickness of 3-5 mm.

3. The process for manufacturing the frying pan according to claim 1, wherein the brown fused alumina sand used in Step (6) has a roughness of 40-60 mesh.

4. The process for manufacturing the frying pan according to claim 1, wherein the sanding in Step (6) is performed for 30 min.

5. The process for manufacturing the frying pan according to claim 1, wherein the cleaning in Step (7) specifically comprises the following steps of:
    ① (performing primary spraying and washing on the frying pan by using water with a temperature of 40-50° C. under a spraying pressure set as 0.1-0.2 MPa;
    ② degreasing the frying pan that is primarily sprayed and washed, with a degreasing bath solution to remove oil and grease adhered to the surface of the frying pan;
    ③ performing secondary spraying and washing on the degreased frying pan by using water under a spraying pressure set as 0.1-0.2 MPa; and
    ④ performing third spraying and washing on the frying pan that is secondarily sprayed and washed, by using water under a spraying pressure set as 0.1-0.2 MPa.

6. The process for manufacturing the frying pan according to claim 5, wherein the degreasing bath solution used during degreasing is prepared by blending an alkaline degreaser and a degreaser at a ratio of 1:1 with water, with a concentration of 5%, a pH value of 10-12 and an alkalinity of 10-20 mol/L.

7. The process for manufacturing the frying pan according to claim 1, wherein the baking in Step (8) is performed at a temperature of 120-150° C.

8. The process for manufacturing the frying pan according to claim 1, wherein the primer and the finish paint in Step (9) are prepared specifically as follows:
    ① the primer is prepared with the steps of: taking a first black ceramic paint-with, placing the first black ceramic paint on a tumbling machine at a revolving speed of 100-150 turns/min for tumbling for 30 min; and weighing the agitated first black ceramic paint and a second black ceramic paint, placing the first and second black ceramic paints into an airtight container at a ratio of 1:1, and placing the airtight container on the tumbling machine at the revolving speed of 100-150 turns/min for tumbling for 2-3 hours to obtain a cured primer; and
    filtering the cured primer with a sieve screen of 150-200 mesh to obtain the primer required for spraying; and
    ② the finish paint is prepared with the steps of: weighing a first overprint varnish and a second overprint varnish, placing the first and second overprint varnishes into an airtight container at a ratio of 1:2, and placing the airtight container on the tumbling machine at the revolving speed of 100-150 turns/min for tumbling for 2-3 hours to obtain a cured finish paint; and filtering the cured finish paint with a sieve screen of 150-200 mesh to obtain the finish paint required for spraying.

9. The process for manufacturing the frying pan according to claim 1, wherein in Step (10), an ambient temperature of a spray room is 26-30° C., and a thickness of each coating sprayed is controlled to be 20-40 um.

10. The process for manufacturing the frying pan according to claim 1, wherein the baking and curing in Step (11) is performed at a temperature of 190-200° C. for 30 min.

* * * * *